March 27, 1956  C. T. HATCH ET AL  2,739,694
CONVEYOR SYSTEM FOR ADVANCING AND DIVIDING A SERIES OF
ARTICLES TO VARIABLY PRESELECTED SEPARATE CONVEYORS
Filed Feb. 23, 1952  5 Sheets-Sheet 1
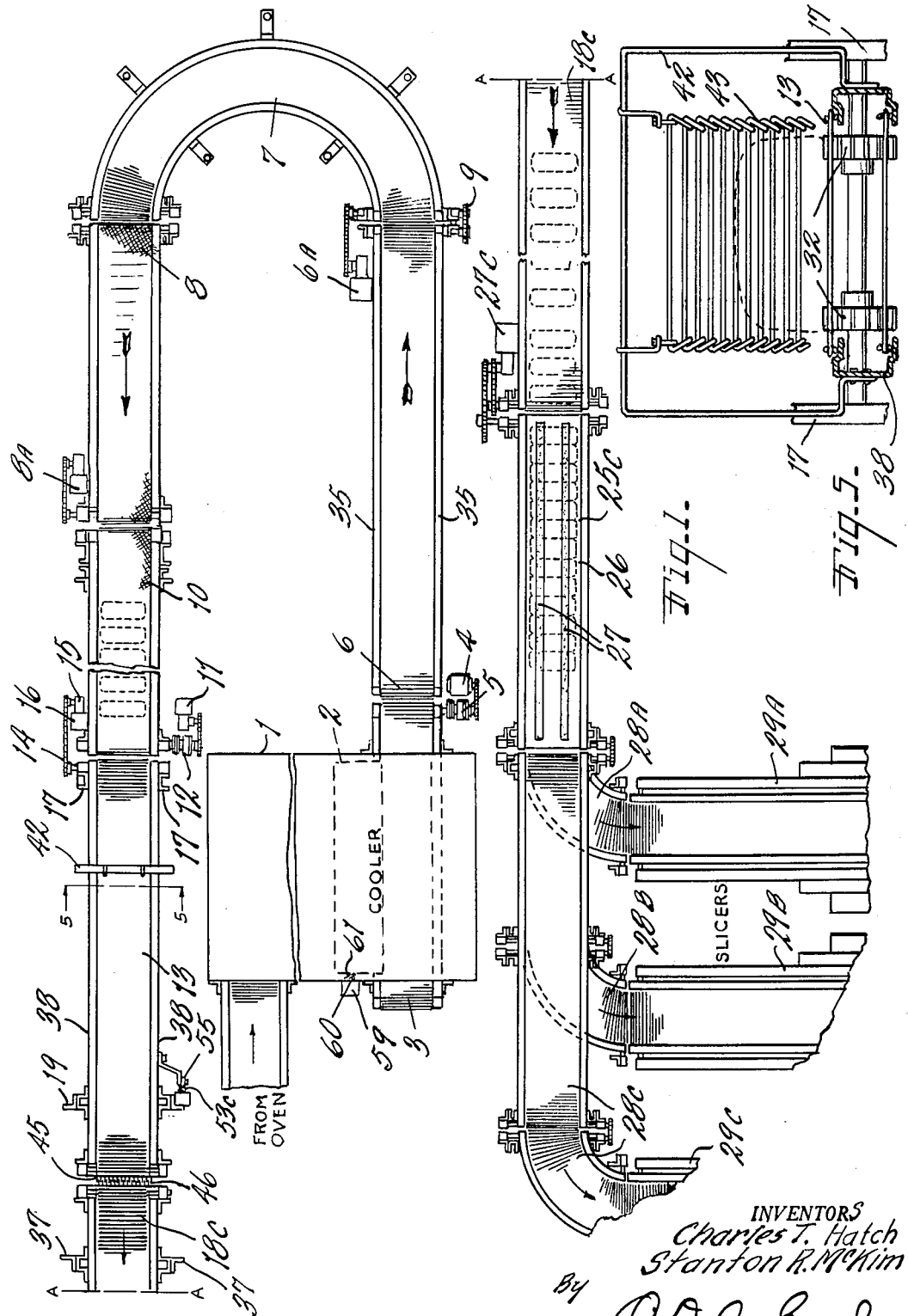
INVENTORS
Charles T. Hatch
Stanton R. McKim
By
Geo. Q. Earl
ATTORNEY.

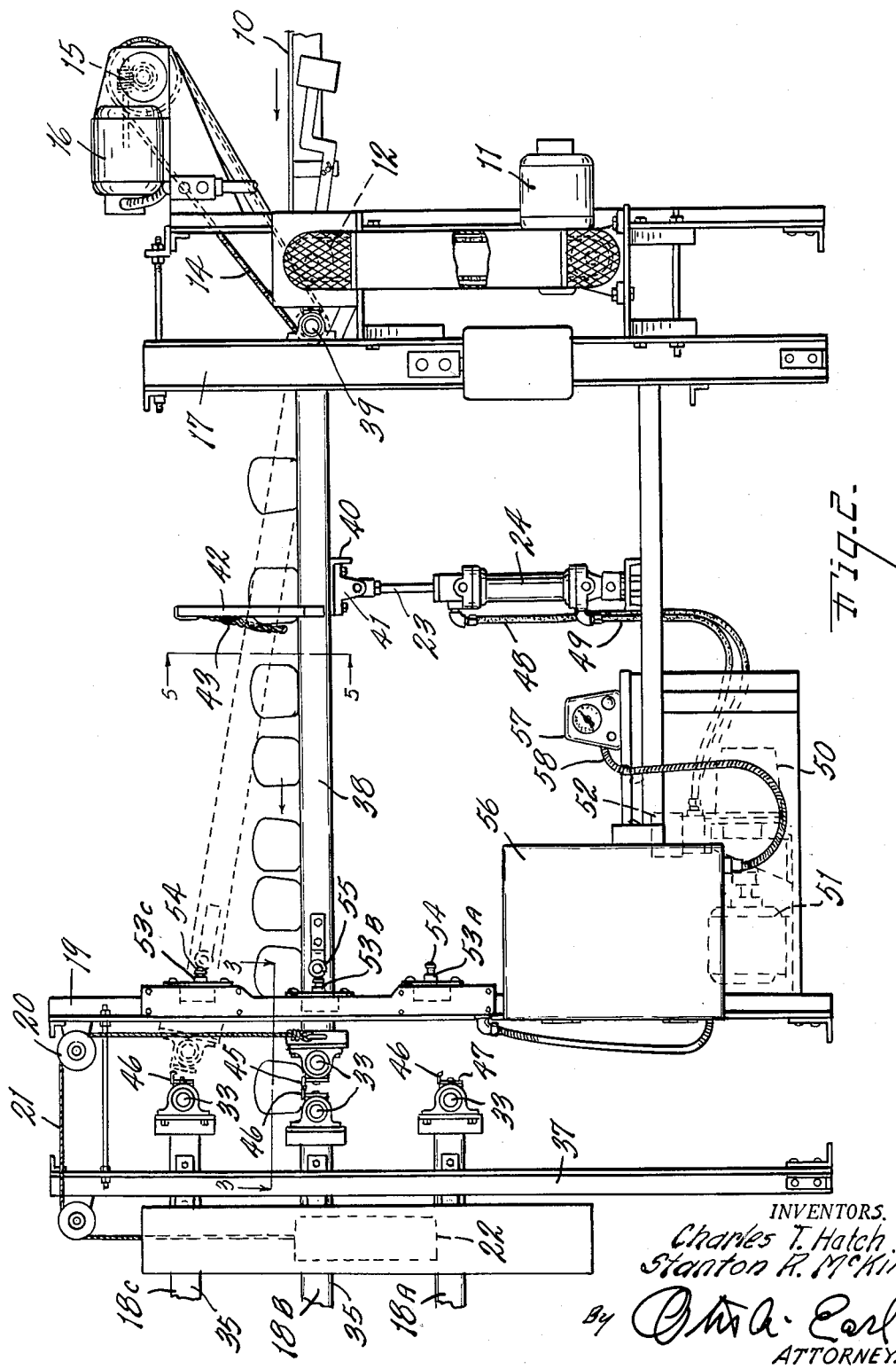

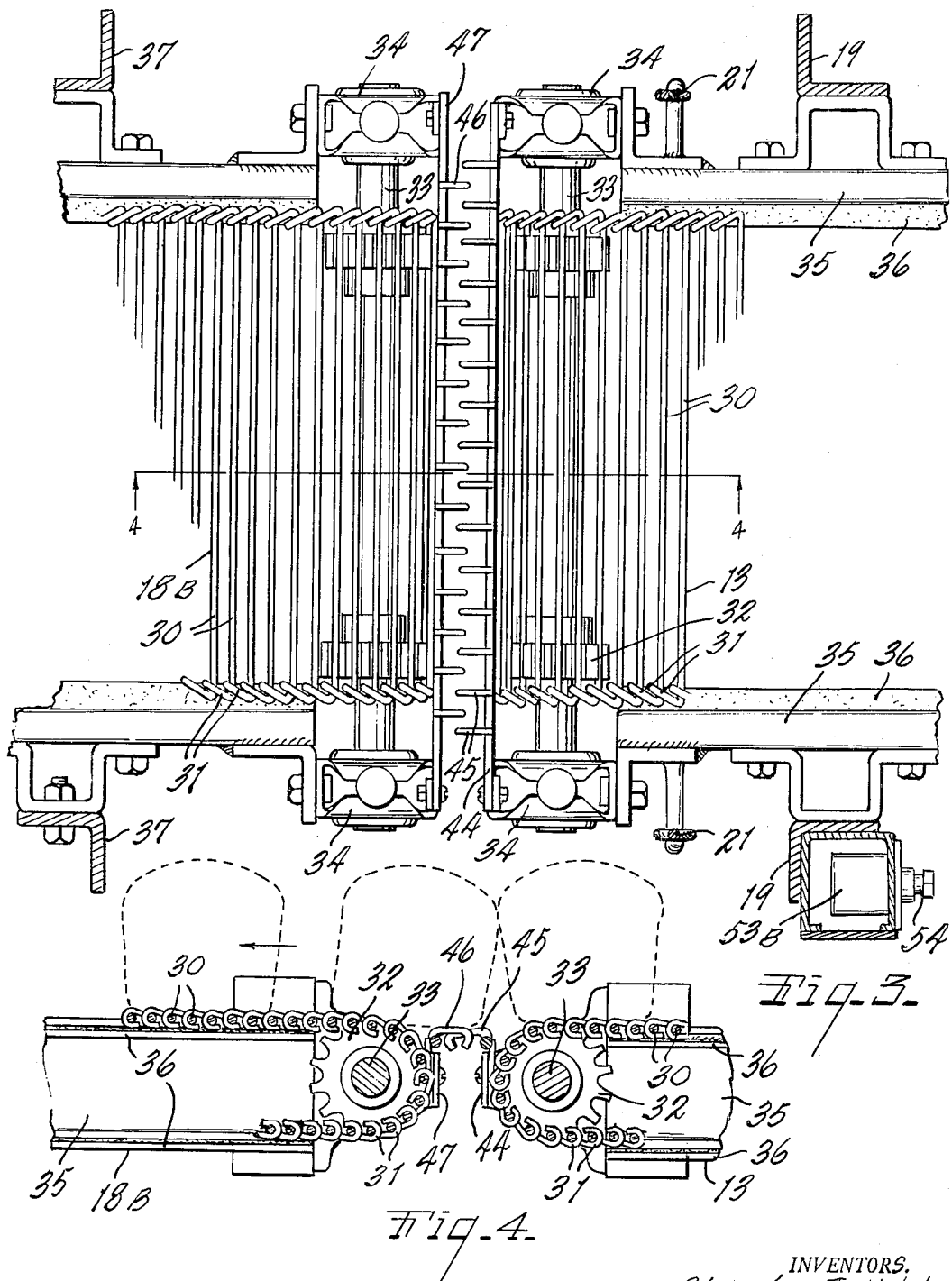

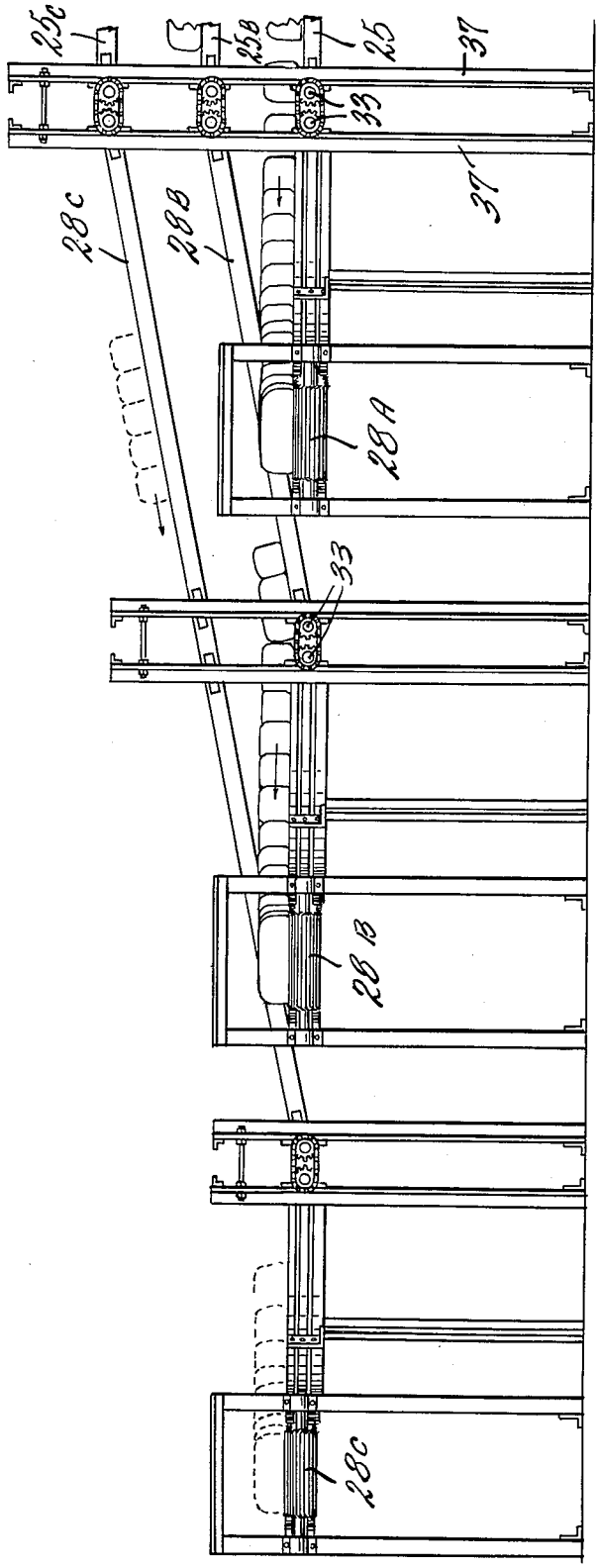

INVENTORS
Charles T. Hatch
Stanton R. McKim

United States Patent Office 2,739,694
Patented Mar. 27, 1956

2,739,694

CONVEYOR SYSTEM FOR ADVANCING AND DIVIDING A SERIES OF ARTICLES TO VARIABLY PRESELECTED SEPARATE CONVEYORS

Charles T. Hatch and Stanton R. McKim, Albion, Mich., assignors to Union Steel Products Company, Albion, Mich.

Application February 23, 1952, Serial No. 272,942

18 Claims. (Cl. 198—31)

This invention relates to improvements in a conveyor system for advancing and dividing a series of articles to variably preselected separate conveyors.

More particularly this invention relates to a conveyor system for receiving loaves of bread delivered from a continuously operating automatic cooler system, and advancing the loaves of bread in continuous succession to a tier selector which will divide the continuous flow of bread into two or more paths or streams of bread traveling on vertically spaced separate conveyors.

The principal objects of this invention are:

First, to provide a conveyor system which will automatically receive and carry away the entire output of a high capacity bread cooler, and deliver the bread thus advanced in preselected proportions on two or more separate conveyors disposed one above the other and each delivering to a separate slicing and wrapping machine.

Second, to provide a tier selector in the form of a vertically swingable conveyor section that will swing between vertically spaced receiving conveyors in preselected timed relationship with the delivery of bread by a cooling system or other apparatus to a receiving conveyor.

Third, to provide an article advancing conveyor with separately driven consecutive sections that can be started and stopped independently to control the flow of articles to a vertically swingable conveyor section or tier selector to permit the tier selector to operate and move between its several positions without discharging articles between the several receiving tiers.

Fourth, to provide an interconnected electrical and hydraulic control for the operating mechanism of a vertically adjustable conveyor that will permit the conveyor to be shifted automatically through a variety of sequences to come to rest successively with its delivery end in opposed delivering relationship to a plurality of vertically spaced receiving conveyors.

Fifth, to provide a conveyor system with separately driven aligned sections with part of the sections operating at slower speed to receive articles from the faster operating sections whereby the articles are brought into closely spaced relationship for delivery to a processing machine.

Sixth, to provide a conveyor system for a bakery which will permit the entire output of the ovens and cooler to be delivered automatically in any preselected proportion to a plurality of bread slicing machines.

Other objects and advantages of our invention will be apparent from a consideration of the following description and claims. The drawings, of which there are five sheets, illustrate a highly practical embodiment of our conveyor system.

Fig. 1 is a fragmentary plan view of the conveyor system and the bread cooling and slicing apparatus associated therewith. The view is broken in two, with the lower portion being a longitudinal continuation of the upper portion at the lines A—A.

Fig. 2 is a fragmentary side elevational view of the tier selector of the conveyor which divides the continuous flow of bread between three vertically spaced receiving conveyors.

Fig. 3 is an enlarged fragmentary plan view of the adjacent ends of the tier selector and one of the receiving tiers in operative relation.

Fig. 4 is a fragmentary vertical longitudinal cross sectional view taken along the plane of the line 4—4 in Fig. 3.

Fig. 5 is a fragmentary vertical transverse cross sectional view through the tier selector taken along the plane of the line 5—5 in Fig. 2.

Fig. 6 is a side elevational view of the delivery ends of the three tiered conveyors illustrated in Figs. 1 and 2.

Figure 7:
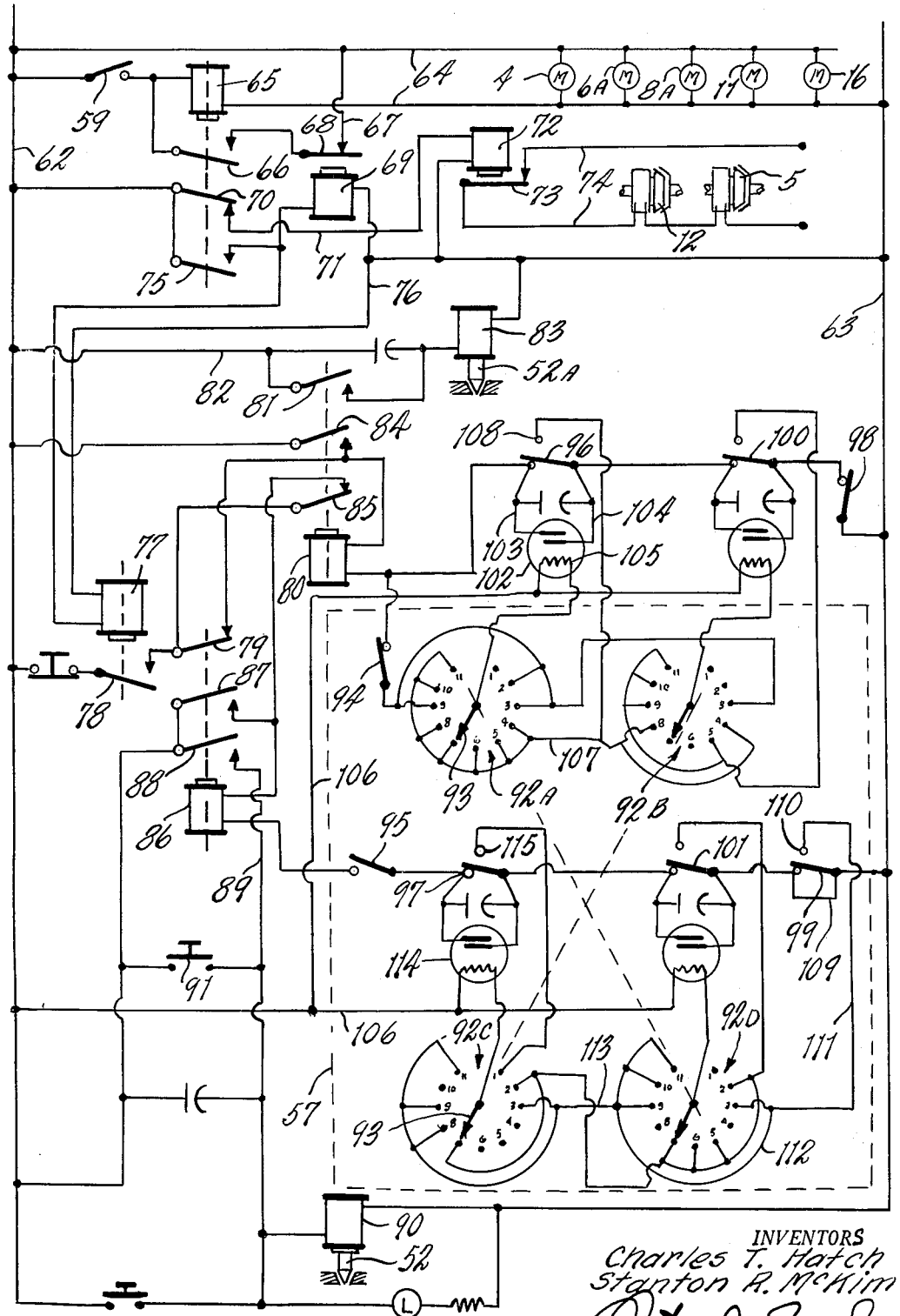
Fig. 7 is a schematic diagram of the control circuit for regulating the movement of the tier selector shown in Figs. 1 and 2.

Modern bakeries are provided with automatic ovens and coolers that will deliver loaves of freshly baked bread at such a rapid rate that difficulty has been encountered in carrying away the bread and delivering it to automatic slicing machines. Our conveyor system is designed to overcome this difficulty, and in the drawings in Fig. 1 we have conventionally illustrated at 1 a portion of an automatic cooler, the details of which are unimportant to the present invention. It is sufficient for an understanding of our invention to point out that the cooler delivers automatically toward the lower end illustrated, and periodically tips a tray indicated at 2 to deliver or empty fifteen or twenty loaves of bread from the cooler. The bread thus delivered from the cooler is received by a first receiving conveyor 3 that runs or advances transversely across the end of the cooler. The loaves of bread are deposited in transversely extending position across the conveyor 3, and are delivered by the conveyor to the right as shown in Fig. 1. Desirably the conveyor 3 operates at approximately 65 feet per minute in order to entirely remove the batch of bread from one tray before the next successive tray of the cooler is dumped. In order that the loaves of bread will not become disarranged on the conveyor 3, the conveyor is operated intermittently by means of an electric motor 4 driving through a magnetic or other electrically controlled clutch 5. Thus the conveyor is stopped to receive the charge of bread loaves and immediately started to remove the loaves. The control of the clutch 5 will be described in greater detail presently.

The receiving conveyor 3 delivers at its right end to an advancing conveyor 6 which may be driven by a motor 6A at a slightly lower lineal speed, say 55 feet per minute, than the receiving conveyor 3. While the shape and direction of the conveyor 6 may vary in different installations, the conveyor 6 may deliver to a curved conveyor 7 that directs the loaves of bread through a 180 degree turn to a downwardly inclined canvas belt conveyor 8. The conveyors 6 and 7 are mechanically connected as at 9 to be driven by the same motor.

The inclined canvas conveyor 8 is also optional depending upon the space available for the installation and it is driven at about the same speed as the conveyors 6 and 7 by a separate motor 8A. The inclined conveyor 8 delivers to a relatively short horizontal conveyor 10 that is approximately 6 feet in length. The conveyor 10 is also of the canvas belt type and is driven by a motor 11 operating through a magnetic or other electrically actuated clutch 12. The delivery end of the short conveyor 10 delivers to a vertically swingable conveyor section 13 which may be conveniently designated as a tier selector. The tier selector conveyor 13 is driven by a chain 14 from a gear box 15 and separate motor 16 illustrated in Fig. 2. It is pointed out that the chain 14 drives the end of the conveyor which is pivotally supported on suitable uprights or supports 17. The left end of the tier selector 13 as viewed in Figs. 1 and 2 is vertically swingable as indicated in Fig. 2 to present its delivery end in opposed relationship to three vertically spaced or tiered conveyors 18A, 18B, and 18C. Guide uprights 19 for the swinging end of the tier selector support pulleys 20 over which a rope 21 extends from the tier selector to a counterweight 22 for partially supporting the weight of the tier selector. The tier selector is adjusted vertically by means of the piston rod 23 of a hydraulic cylinder 24. The actuation and control of the cylinder 24 will be described in greater detail presently.

The tiered conveyors 18A, 18B, and 18C deliver to three vertically tiered conveyors 25. The conveyors 25 consist of smooth supporting ways or decks 26 over which a pair of plastic surfaced belts 27 travel. The purpose of the smooth deck 26 and the plastic surface on the belts 27 is to permit the conveyor 25 to be operated at a considerably slower speed, say 25 feet per minute, than the tier selector and other conveyors which operate at approximately 55 feet per minute as was previously explained. The speed of 25 feet per minute is approximately the right speed for delivering bread to the slicing machines.

The several conveyors 25 which may be conveniently designated as slowdown conveyors deliver at their left end to three delivery conveyors 28A, 28B, and 28C which are provided with angled turns at their ends for delivery to the slicing machines 29A, 29B, and 29C respectively. As is most clearly illustrated in Fig. 6 the delivery conveyors 28B and 28C are inclined downwardly from the elevated positions of the slowdown conveyors 25B and C to bring the bread to the level of the slicing machines that are usually mounted at floor level.

The conveyors 3, 6, 7, 18 and 28 as well as the tier selector conveyor 13 are all of interlinked transversely extending link type in which a plurality of transversely extending rods 30 are provided with laterally turned ends 31 linking with the next preceding cross rod.

The several conveyors are trained around suitable pulleys 32 at their ends, the pulleys having notched or toothed peripheries adapted to receive and advance the several crossrods 30. The pulleys are drivingly mounted on suitable cross shafts 33 and the shafts are rotatably carried in suitable bearings 34 secured to the ends of side frame members or rails 35 of the respective conveyors. Where appropriate, the shafts 33 are extended for connection to the driving mechanisms as will be understood. The side rails 35 of the conveyors are provided with inwardly projecting tracks 36 for supporting the working reaches of the conveyors. Suitable supporting framework and uprights are provided as at 37 for supporting the several conveyors in relative operating positions.

Turning now to a more detailed consideration of the tier selector and its operation, attention is invited to Figs. 2, 3 and 4. The side rails 38 of the tier selector conveyor are pivotally supported at their right end to the drive shaft 39 of the tier selector conveyor. A crossbar 40 connected between the side rails 38 intermediate of their ends carries a depending bracket 41 to which the upper end of the piston rod 23 is pivotally connected. A bridge or inverted U-shaped structure 42 extends above and across the tiered selector conveyor and carries a freely suspended length of the link rod conveyor at 43 as is more particular shown in Fig. 5. The function of the suspended conveyor section 43 is to hang in the path of the advancing loaves of bread and straighten each loaf transversely across the tier selector conveyor should the loaves have become twisted on the conveyor.

The left or swinging end of the tier selector 13 is provided with a crossbar 44 secured to the longitudinally outer sides of the bearings 34 that support the idler pulleys of the tier selector conveyor. The crossbar 44 is thus spaced outwardly from the tier selector conveyor and carries a plurality of outwardly projecting fingers 45 that are offset or interleave with respect to similar fingers 46 carried on crossbars 47 mounted at the right ends of the receiving conveyors 18A, B, and C. The fingers 45 and 46 form an effective bridge for transferring loaves of bread from the tier selector conveyors to the receiving conveyors as is clearly illustrated in Fig. 4. With particular reference to Fig. 2 it will be noted that the right ends of the receiving conveyors 18A and 18C project slightly further to the right than the intermediate receiving conveyor 18B. This places the ends of the several receiving conveyors along the arc traversed by the swinging end of the tier selector.

The hydraulic cylinder 24 and piston rod 23 are actuated by means of hydraulic fluid supplied through the conduits 48 and 49 extending from a hydraulic pump 50 mounted in a housing underneath the tier selector. The pump 50 is continuously driven by an electric motor 51 and the delivery of fluid to the conduits is controlled by a pair of solenoid controlled valves 52 and 52A. The valves and their solenoids are in turn controlled by a series of switches as will be described in detail presently. Directly associated with the tier selector conveyor are three locating switch assemblies 53A, 53B, and 53C mounted on one of the uprights 19 alongside the swinging end of the tier selector. Each of these switch assemblies has an actuating plunger 54 which projects to the right as illustrated in Fig. 2 to be engaged and depressed by a roller 55 mounted on the side rail 38 of the tier selector. As with the ends of the receiving conveyors 18, the switch assemblies 53 are mounted along an arc to be properly engaged by the roller 55. The control circuits and wiring for interconnecting the switches 53 and the motor 51 are conveniently housed in a switch cabinet 56. A sequence selecting switch 57 is connected by a cable 58 to the wiring within the housing 56, and it should be noted that the sequence selector switch may be located at any convenient position adjacent to or remote from the tier selector.

Coacting with the switch assemblies 53 on the tier selector and the other elements of the control circuit is a switch 59 mounted adjacent the discharge end of the cooler 1 and illustrated in Fig. 1. The switch 59 has an actuating plunger 60 positioned to be engaged by the lugs 61 on the cooler trays to actuate the switch just prior to the tipping or emptying motion of the tray. The function of this switch 59 in the control circuit will be further described presently.

The control circuit for regulating the operation of the conveyor system is conventionally illustrated in Fig. 7. The control circuit illustrated is provided with sufficient elements and switching devices to accommodate a conveyor system having four vertically spaced receiving conveyors in place of the three receiving conveyors illustrated in the other figures of the drawings. However, the operation of the control system is the same whether three or four receiving conveyors are provided. The control circuit includes electrical supply lines 62 and 63. The several motors 4, 6A, 8A, 11 and 16 for driving the several sections of the conveyor are connected across the supply lines by conductors 64 to be energized whenever the system is actuated. The cooler trip switch 59 is connected from one of the supply lines to the solenoid 65 and from there to the other supply line. The switch 59 makes a momentary contact just before the cooler tray is tipped, and this contact serves to energize the solenoid 65. A self actuated holding switch 66 serves to hold the solenoid 65 actuated after the switch 59 has opened. The conductor 67 in the holding circuit for the solenoid 65 includes a solenoid operated switch 68 that is normally closed but is arranged to be opened by a time delay solenoid 69 as will be explained. Energization of the solenoid 65 also opens a normally closed switch 70 in the circuit 71 to a relay 72. De-energization of the relay 72 permits the relay operated switch 73 to open in the direct current energizing circuit 74 to the two magnetic clutches 5 and 12 which control the driving connection to the receiving conveyor 3, and the short horizontal conveyor 10 respectively. Energization of the solenoid 65 also closes a normally open switch 75 in the energizing circuit 76 to the previously described time delay solenoid 69. Closing of the switch 75 does not immediately cause the solenoid 69 to open the switch 68, and such action takes place only after a predetermined time delay as will be described. The closing of the switch 75 also energizes a second time delay solenoid 77 which is connected in parallel with the time delay solenoid 69. However, the time delay solenoid 77 is not immediately effective to actuate its associated switch as will be described.

The first apparent effect of the closing of the cooler trip switch 59 is that both the receiving conveyor 3 and the short horizontal conveyor 10 are immediately stopped. The other conveyors continue to operate while the bread on the cooler tray is dumped onto the now stationary receiving conveyor 3. Note that the tier selector conveyor 13 will continue to operate at this time so as to clear itself of bread. Oncoming bread on the other conveyors is stopped by the now stationary horizontal conveyor 10. The flat canvas belt type of the conveyor 10 permits any incoming bread to be slid forwardly onto the canvas belt without injury to the loaves of bread. This has the action of reducing the spacing between the loaves of bread on the short conveyor 10.

After the conveyors 3 and 10 have been stopped for a sufficient time to receive the incoming bread from the cooler and to clear the tier selector conveyor, the time delay solenoid 77 becomes operative to close the switch 78. The switch 78 is connected in series with a normally closed relay actuated switch 79 to the solenoid 80. The energization of the solenoid 80 is operative to close a normally open switch 81 in the conductor 82 that energizes the solenoid 83 of the solenoid operated valve 52A. As was previously described, the solenoid operated valve 52A controls the delivery of fluid pressure to the conduit 49 to move the piston rod 23 upwardly to elevate the tier selector. Other elements must be closed to effect the energization of the solenoid 80 as will be described, but assuming these conditions to be met, the solenoid 80 functions to close its own holding switch 84 to hold itself in energized condition. At this time in the cycle of operation of the circuit the time delay relay 69 will have run its time delay period and become operative to open the previously described switch 68 in the holding circuit of the previously described solenoid 65. Consequent de-energization of the solenoid 65 permits the normally closed switch 70 to close, re-energizing the solenoid 72 and closing the switch 73 to re-energize the magnetic clutches 5 and 12. The receiving conveyor 3 and the short conveyor 10 accordingly resume their operation to advance bread from the cooler and to the tier selector conveyor which has now moved to its new preselected elevation.

It will be noted that the closing of the relay operated switch 78 by the time delay solenoid 77 also completes a circuit through a normally closed relay operated switch 85 to a solenoid 86. The solenoid operated switch 85 is arranged to be actuated by the previously described solenoid 80, and is normally closed in the un-energized position or condition of the solenoid 80. If for reason of other conditions in the selector circuit to be described, the solenoid 80 is not energized when the switch 78 is closed, an energizing circuit will be completed to the solenoid 86. The solenoid 86 operates to close a self-actuated holding switch 87 and also to open the previously described switch 79 in the energizing circuit to solenoid 80. As was the case with the solenoid 80, the solenoid 86 depends for energization upon the predetermined condition of other switches in its circuit which will be described presently. However, assuming these conditions to exist it will be noted that energization of the solenoid 86 closes a switch 88 that is connected through the conductor 89 to the solenoid 90 of the solenoid operated valve 52. The valve 52 controls the supply of fluid to the conduit 48 to effect lowering motion of the piston rod and the tier selector. For purposes of convenience in description the solenoid 83 and solenoid operated valve 52A may be referred to as the "up" solenoid and valve, while solenoid 90 and valve 52 may be referred to as the "down" solenoid and valve. Correspondingly solenoid 80 may be designated the "up" control solenoid, and solenoid 86 may be designated the "down" control solenoid. A manually operative switch 91 is bridged across the solenoid switch 88 to energize the "down" solenoid 90 and return the tier selector to its lower level independently of the other switches and solenoids in the circuit.

In describing the function and operation of the "up" control solenoid 80 and the "down" control solenoid 86 it was pointed out that additional elements and switches must be properly positioned to effect energization of either of these solenoids. These other elements include the selector switch 57, the locator switch assemblies 53A, 53B, 53C, and certain time delay relays that will now be described. The selector switch 57 which is illustrated conventionally in Fig. 7 includes four switch elements, 92A, 92B, 92C, and 92D that are ganged together as conventionally illustrated for concurrent angular rotation. Each of these switches includes a rotatable switch arm 93 that is selectively engageable with a plurality of angularly spaced contacts that are selectively interconnected to each other and to other elements of the control circuit as will be described.

The switch assemblies 53A, 53B and 53C each include two electrical switch elements, one of which is closed when the other is open. For instance, when the roller 55 on the tier selector conveyor is engaged with the actuating plunger 54 of the lower switch assembly 53A, one of the switch elements of the assembly 53A will be open while the other switch element will be closed. These elements are indicated in the conventional circuit at 94 and 95. It will be noted that the switch 94 is connected in series with the energizing circuit to the "up" control solenoid 80. The switch elements of the switch assembly 53B are indicated at 96 and 97, while the switch elements of the switch assembly 53C are indicated at 98 and 99. The related switch elements 100 and 101 are spare switches which would be used if an additional tier or position were provided on the physical conveyor assembly illustrated in Fig. 2. The conventionally illustrated switches 92B, 92D, 100, and 101 in Fig. 7 have no physical counterpart in the other figures. Neither is the vacuum tube associated with these switches employed when only three tiers are used in the conveyor system.

The circuit for energizing the "up" control solenoid 80 includes the switch element 96 which is closed when the tier selector is not positioned adjacent to the middle tier 18B and the switch assembly 53B. Thus when the tier selector is at its lowest elevation the switch 96 will be closed in the solenoid energizing circuit as illustrated, and the solenoid will be energized at the proper time. As the tier selector rises to actuate the intermediate switch assembly 53B the switch 96 will be opened in the energizing circuit of the solenoid 80 and the previously described circuit actions take place to close the "up" solenoid valve 52A. The tier selector thus comes to rest at the intermediate tier of the conveyor system. The switch 96 is bridged in the energizing circuit of the solenoid by a vacuum tube relay 102. This relay has one of its terminals 103 connected to one side of the switch 96, while its other terminal 104 is connected to the other side of the switch. The vacuum tube relay 102 is of a well known type that is rendered operative to conduct current between its elements after its cathode or heater 105 has been energized for a predetermined period of time. Energization of the heater 105 is obtained from a conductor 106 through the center or movable arm 93 of the selector switch 92A to a conductor 107 that is connected with pre-selected ones of the annularly arranged terminals of the selector switch. The conductor 107 is in turn connected to a contact 108 that is engaged by the switch 96 in the open position of the switch to connect the conductor 107 to the opposite side of the supply line. As the circuit is illustrated in Fig. 7, the heater 105 will be energized when the switch 96 is opened because the rotatable switch arm 93 is engaged with terminal 7 that is connected to the conductor 107. However, due to the time delay characteristic of the vacuum tube relay 102 the relay is not immediately operative to conduct current across the switch 96, and the circuit to the "up" control relay remains broken. Desirably the vacuum tube relay 102 is designed to have a five second delay before its terminals become conductive, and to similarly have a five second delay after its heater has been de-energized before the terminals become non-conductive.

After the cooler tray switch 59 has again been actuated in a second cycle of the system and circuit, a second energizing current is applied to the "up" control solenoid 80. This current is carried through the vacuum tube relay 102 which is now conductive and from thence through the switch 98 associated with the upper switch assembly 53C. This is assuming that the switch 100 is inoperative and continually closed as shown due to the absence of a fourth tier in the conveyor system. The tier selector will accordingly be again actuated to rise until it engages the switch assembly 53C and opens the switch 98. Opening the switch 98 de-energizes the "up" control relay and stops the tier selector in its uppermost position.

With the tier selector in its uppermost position the switch 98 will be open as previously described, while the switch 95 in the energizing circuit of the "down" control relay 86 will be closed. The subsequent actuation of the cooler tray switch 59 and the several solenoids will thus result in the energization of the "down" control solenoid 86. It is pointed out that the switch 99 which forms one half of the upper switch assembly 53C will also be in open position but the circuit from the relay 86 and the switch 95 is bridged across the switch 99 by a jumper 109. The "down" solenoid 90 and solenoid operated valve 52 will accordingly be actuated to start the tier selector conveyor downwardly. The open position of the switch 98 prevents the "up" control solenoid 80 from being similarly energized. The tier selector conveyor will continue downwardly until it reaches the intermediate switch assembly 53B and opens the switch 97. Here again it is assumed that the switch 101 and the selector switch 92D are inoperative in a three tier system. Opening of the switch 97 breaks the energizing circuit to the "down" control solenoid 86 and the tier selector comes to rest at the intermediate tier 18B. It is pointed out that while the tier selector was in its uppermost position the switch 99 was closed upon a terminal 110 that connects through a conductor 111 and 112 to a conductor 113 associated with the selector switch 92C. Had the conductor 113 been connected to a contact of switch 92C with which the central swingable arm 93 was engaged, the vacuum tube relay 114 associated with the switch 97 would have been rendered conductive and the circuit to the "down" control solenoid would not have been broken by opening of the switch 97. Thus, if it is desired to have the tier selector move automatically downwardly from the top tier all the way to the bottom tier, it will be necessary to adjust the selector switch 92C to terminals 3, 8, 9, or 11.

With the selector switches 92A to D in the position illustrated in Fig. 7, the next actuation of the cooler trip switch 59 will find the switches 96 and 97 opened against the contacts 108 and 115. The contact 115 is connected to a conductor 116 that extends to the contact 1 of selector switch 92C that is inoperative so the vacuum tube relay 114 is inoperative to complete the circuit to the "down" control solenoid 86. The contact 108 engaged by the switch 96 is, however, connected to the conductor 107, and the contact number 7 of the selector switch 92A so that the vacuum tube relay 102 is operative and the "up" control solenoid 80 is energized to start the tier selector upwardly as was previously described. Thus, with the circuit connected as illustrated the tier selector will move automatically from the intermediate tier 18B to the upper tier 18C and back again. Other pre-selected cycles or sequences of operation are obviously possible by readjusting the sequence selector switches 92A to D or by rearranging the conductors connecting the contacts of these latter switches to the heaters of the several vacuum tube relays.

It will thus be seen that each actuation of the cooler tray switch 59 results in movement or adjustment of the tier selector conveyor to a different receiving tier. The output of the ovens and the cooler can thus be automatically divided in pre-selected proportions between the several tiers. This is highly advantageous since one of the slicing machines served by one of the tiers may have to be shut down for repair or adjustment, and this need not result in stopping the flow of bread to the other slicers. The entire system operates automatically and can be controlled from points adjacent to the slicers or remotely therefrom, and a great saving in manual labor is effected in not requiring the manual transfer of bread from the advancing conveyors to the several slicing machines. The most practical adjustment of the circuit is to have the tier selector advance consecutively from a starting level to selected other levels and then return to the starting level. This divides the bread equally to the selected slicing machines which can be operated at near capacity. The circuit arrangement illustrated would be desirable if the slicers 29B and 29C are considered as the main operating machines, and the slicer 29A is considered as a standby machine for use when one of the others has to be shut down. While we have thus described a highly practical embodiment of our conveyor and control system, it should be understood that this disclosure is an example only and that a wide variety of modifications of the system are possible without departing from the spirit of our invention.

Having thus described our invention, what we claim to be new and desire to secure by Letters Patent is:

1. A conveying system for advancing bread from an automatically delivering cooler to a plurality of slicing machines comprising, a switch positioned to be actuated by said cooler prior to each unloading operation of the cooler, a first conveyor positioned to receive bread from said cooler, means for driving said first conveyor and interconnected with said switch to be momentarily stopped while said cooler is delivering, advancing conveyors associated with said receiving conveyor to deliver bread therefrom and continuously driven at a slower rate of speed than said receiving conveyor, a third conveyor receiving from said advancing conveyors, means for driving said third conveyor and interconnected with said switch to be stopped while said first conveyor is stopped, a vertically swingable conveyor having one pivoted end positioned to receive bread from said third conveyor, a plurality of delivery conveyors positioned one above the other and having their ends positioned adjacent the path of travel of the swinging end of said swingable conveyor to receive bread therefrom, a plurality of smooth surfaced belt conveyors each positioned to receive bread from a delivery conveyor and driven at a substantially slower speed than said delivery conveyors, separate conveyors each receiving from a different one of said belt conveyors and delivering to a different one of said slicing machines, means for driving said delivery conveyors, said belt conveyors and said advancing conveyors, a plurality of switch assemblies associated one with each of said delivery conveyors and having actuating elements positioned adjacent the path of travel of said swingable conveyor, means on said swingable conveyor engageable with said actuating elements when said swingable conveyor is in registry with said delivery conveyors, means for raising and lowering said swingable conveyor, control means interconnected with said first switch and said switch assemblies and including timed delay switching mechanism connected to actuate said means for raising and lowering said swingable conveyor at a predetermined interval following the stopping of said first and third conveyors, other time delay switch means connected to start said means for driving said first and third conveyors after a predetermined period of inaction, and selectively adjustable switch mechanism interconnected with said switch assemblies for predetermining the sequence of movement of said swingable conveyor between said delivery conveyors.

2. A conveying system for advancing bread from an automatically delivering cooler to a plurality of slicing machines comprising, a switch positioned to be actuated by said cooler prior to each unloading operation of the cooler, a first conveyor positioned to receive bread from said cooler, means for driving said first conveyor and interconnected with said switch to be momentarily stopped while said cooler is delivering, advancing conveyors associated with said receiving conveyor to deliver bread therefrom and continuously driven, a third conveyor receiving from said advancing conveyors, means for driving said third conveyor and interconnected with said switch to be stopped while said first conveyor is stopped, a vertically swingable conveyor having one pivoted end positioned to receive bread from said third conveyor, a plurality of delivery conveyors positioned one above the other and having their ends positioned adjacent the path of travel of the swinging end of said swingable conveyor to receive bread therefrom, separate conveyors each receiving from a different one of said delivery conveyors and delivering to a different one of said slicing machines, means for driving said delivery conveyors, said separate conveyors and said advancing conveyors, a plurality of switch assemblies associated one with each of said delivery conveyors and having actuating elements positioned adjacent the path of travel of said swingable conveyor, means on said swingable conveyor engageable with said actuating elements when said swingable conveyor is in registry with said delivery conveyors, means for raising and lowering said swingable conveyor, control means interconnected with said first switch and said switch assemblies and including timed delay switching mechanism connected to actuate said means for raising and lowering said swingable conveyor at a predetermined interval following the stopping of said first and third conveyors, other time delay switch means connected to start said means for driving said first and third conveyors after a predetermined period of inaction, and selectively adjustable switch mechanism interconnected with said switch assemblies for predetermining the sequence of movement of said swingable conveyor between said delivery conveyors.

3. A conveying system for advancing bread from an automatically delivering cooler to a plurality of slicing machines comprising, a switch positioned to be actuated by said cooler with each unloading operation of the cooler, a first conveyor positioned to receive bread from said cooler, means for driving said first conveyor and interconnected with said switch to be stopped thereby while said cooler is delivering, advancing conveyors associated with said receiving conveyor to deliver bread therefrom and continuously driven, a third conveyor receiving from said advancing conveyors, means for driving said third conveyor and interconnected with said switch to be stopped thereby while said first conveyor is stopped, a vertically swingable conveyor having its pivoted end positioned to receive bread advanced by said third conveyor, a plurality of delivery conveyors positioned one above the other and having their ends positioned adjacent the path of travel of the swinging end of said swingable conveyor to receive bread therefrom, said delivery conveyors each being arranged to delivery to a different one of said slicing machines, means for driving said delivery conveyors and said advancing conveyors, a plurality of switch assemblies associated one with each of said delivery conveyors and having actuating elements positioned adjacent the path of travel of said swingable conveyor, means on said swingable conveyor engageable with said actuating elements when said swingable conveyor is in registry with said delivery conveyors, means for raising and lowering said swingable conveyor, control means interconnected with said first switch and said switch assemblies and including timed delay switching mechanism connected to actuate said means for raising and lowering said swingable conveyor at a predetermined interval following the stopping of said first and third conveyors, other time delay switch means connected to start said means for driving said first and third conveyors after a predetermined period of inaction, and selectively adjustable switch mechanism interconnected with said switch assemblies for predetermining the sequence of movement of said swingable conveyor between said delivery conveyors.

4. A conveying system for advancing bread from an automatically delivering cooler to a plurality of slicing machines comprising, a switch positioned to be actuated by said cooler with each delivery operation of the cooler, a first conveyor positioned to receive bread from said cooler, means for driving said first conveyor and interconnected with said switch to be momentarily stopped while said cooler is delivering, a second conveyor positioned to receive bread advanced by said first conveyors, means for driving said second conveyor and interconnected with said switch to be stopped while said first conveyor is stopped, a vertically swingable conveyor having its pivoted end positioned to receive bread from said second conveyor, a plurality of delivery conveyors positioned one above the other and having their ends positioned adjacent the path of travel of the swinging end of said swingable conveyor to receive bread therefrom, a plurality of smooth surface belt conveyors each positioned to receive bread from a different one of said delivery conveyors and driven at a substantially slower speed than said delivery conveyors, separate conveyors each receiving from a different one of said belt conveyors and delivering to a different one of said slicing machines, means for driving said delivery conveyors, said belt conveyors and said separate conveyors, a plurality of switch assemblies associated one with each of said delivery conveyors and having actuating elements positioned adjacent the path of travel of said swingable conveyor, means on said swingable conveyor engageable with said actuating elements when said swingable conveyor is in registry with said delivery conveyors, means for raising and lowering said swingable conveyor, control means interconnected with said first switch and said switch assemblies and including timed delay switching mechanism connected to actuate said means for raising and lowering said swingable conveyor at a predetermined interval following the stopping of said first and second conveyors, other time delay switch means connected to start said means for driving said first and second conveyors after a predetermined period of inaction, and selectively adjustable switch mechanism interconnected with said switch assemblies for predetermining the sequence of movement of said swingable conveyor between said delivery conveyors.

5. A conveying system for advancing bread from an automatically delivering cooler to a plurality of slicing machines comprising, a switch positioned to be actuated by said cooler with each delivery operation of the cooler, a first conveyor positioned to receive bread from said cooler, means for driving said first conveyor and interconnected with said switch to be momentarily stopped while said cooler is delivering, a second conveyor positioned to receive bread advanced by said first conveyor, means for driving said second conveyor and interconnected with said switch to be stopped while said first conveyor is stopped, a vertically swingable conveyor having its pivoted end positioned to receive bread from said second conveyor, a plurality of delivery conveyors positioned one above the other and having their ends positioned adjacent the path of travel of the swinging end of said swingable conveyor to receive bread therefrom, separate conveyors each receiving from a different one of said delivery conveyors and delivering to a different one of said slicing machines, means for driving said delivery conveyors and said separate conveyors, a plurality of switch assemblies associated one with each of said delivery conveyors and having actuating elements positioned adjacent the path of travel of said swingable conveyor, means on said swingable conveyor engageable with said actuating elements when said swingable conveyor is in registry with said delivery conveyors, means for raising and lowering said swingable conveyor, control means interconnected with said first switch and said switch assemblies and including timed delay switching mechanism connected to actuate said means for raising and lowering said swingable conveyor at a predetermined interval following the stopping of said first and second conveyors, other time delay switch means connected to start said means for driving said first and second conveyors after a predetermined period of inaction, and selectively adjustable switch mechanism interconnected with said switch assemblies for predetermining the sequence of movement of said swingable conveyor between said delivery conveyors.

6. A conveyor system for advancing bread from an oven to a plurality of packaging machines comprising, a receiving conveyor positioned to receive bread from said oven, means for intermittently operating said receiving conveyor in timed relationship with delivery of bread from said oven, a forwarding conveyor positioned to advance bread received from said first conveyor, means for intermittently driving said forwarding conveyor concurrently with said receiving conveyor, a selector conveyor having one end pivotally supported adjacent said forwarding conveyor to receive bread therefrom, means for continuously driving said selector conveyor, means for vertically swinging the other end of said selector conveyor, a plurality of delivery conveyors having their receiving ends positioned in vertically spaced relation adjacent the path of the swinging end of said selector conveyor to receive bread therefrom, means connecting said delivery conveyors to said packaging machines to deliver bread thereto, means for continuously driving said delivery conveyors and said last mentioned means, control means connected to actuate said means for raising and lowering said selector conveyor at a predetermined time after each stoppage of said receiving and forwarding conveyors, and selectively adjustable switch means connected to said control means for predetermining the direction and extent of movement of said selector conveyor in predeterminable sequence between said delivery conveyors.

7. A conveyor system for advancing bread from an oven to a plurality of packaging machines comprising, a receiving conveyor positioned to receive bread from said oven, means for intermittently operating said receiving conveyor in timed relationship with delivery of bread from said oven, a selector conveyor having one end pivotally supported and positioned to receive bread advanced by said receiving conveyor, means for continuously driving said selector conveyor, means for vertically swinging the other end of said selector conveyor, a plurality of delivery conveyors having their receiving ends positioned in vertically spaced relation adjacent the path of the swinging end of said selector conveyor to receive bread therefrom, means connecting said delivery conveyors to said packaging machines to deliver bread thereto, means for continuously driving said delivery conveyors and said last mentioned means, control means connected to actuate said means for raising and lowering said selector conveyor at a predetermined time after each stoppage of said receiving conveyor, and selectively adjustable switch means connected to said control means for predetermining the direction and extent of movement of said selector conveyor in predeterminable sequence between said delivery conveyors.

8. A conveyor system for advancing bread from an oven to a plurality of packaging machines comprising, a receiving conveyor positioned to receive bread from said oven, means for intermittently operating said receiving conveyor in timed relationship with delivery of bread from said oven, a selector conveyor having one end pivotally supported and positioned to receive bread advanced by said receiving conveyor, means for continuously driving said selector conveyor, means for vertically swinging the other end of said selector conveyor, a plurality of delivery conveyors having their receiving ends positioned in vertically spaced relation adjacent the path of the swinging end of said selector conveyor to receive bread therefrom, said delivery conveyors being associated one with each of said packaging machines to deliver bread thereto, means for continuously driving said delivery conveyors, control means connected to actuate said means for raising and lowering said selector conveyor at a predetermined time after each stoppage of said receiving conveyor, and selectively adjustable switch means including position sensing switches associated with each of said delivery conveyors and actuated by said selector conveyor, said last switch means being connected to said control means for predetermining the direction and sequence of movement of said selector conveyor in predeterminable sequence between said delivery conveyors.

9. A conveyor system for advancing bread from an oven to a plurality of packaging machines comprising, a receiving conveyor positioned to receive bread from said oven, means for intermittently operating said receiving conveyor in timed relationship with delivery of bread from said oven, a selector conveyor having one end pivotally supported and positioned to receive bread advanced by said receiving conveyor, means for continuously driving said selector conveyor, means for vertically swinging the other end of said selector conveyor, a plurality of delivery conveyors having their receiving ends positioned in vertically spaced relation adjacent the path of the swinging end of said selector conveyor to receive bread therefrom, said delivery conveyors being associated one with each of said packaging machines to deliver bread thereto, means for continuously driving said delivery conveyors, control means connected to actuate said means for raising and lowering said selector conveyor at a predetermined time after each stoppage of said receiving conveyor, and switch means including position sensing switches associated with each of said delivery conveyors and actuated by said selector conveyor, said last switch means being connected to said control means for predetermining the direction and sequence of movement of said selector conveyor between said delivery conveyors.

10. A conveyor system for advancing articles delivered intermittently from a source of supply to a plurality of handling machines comprising, a receiving conveyor positioned to receive articles from said source, means for intermittently operating said receiving conveyor in timed relationship with delivery of said articles, a selector conveyor having one end pivotally supported and positioned to receive articles advanced by said receiving conveyor, means for continuously driving said selector conveyor, means for vertically swinging the other end of said selector conveyor, a plurality of delivery conveyors having their receiving ends positioned in vertically spaced relation adjacent the path of the swinging end of said selector conveyor to receive articles therefrom, said delivery conveyors being arranged to deliver to said handling machines, means for continuously driving said delivery conveyors, control means connected to actuate said means for raising and lowering said selector conveyor at a predetermined time after each stoppage of said receiving conveyor, and selectively adjustable switch means including position sensing switches associated with each of said delivery conveyors and positioned to be actuated by said selector conveyor, said last switch means being connected to said control means for predetermining the direction and sequence of movement of said selector conveyor in predeterminable sequence between said delivery conveyors.

11. A conveyor system for advancing articles delivered intermittently from a source of supply to a plurality of handling machines comprising, a receiving conveyor positioned to receive articles from said source, means for intermittently operating said receiving conveyor in timed relationship with delivery of said articles, a selector conveyor having one end pivotally supported and positioned to receive articles advanced by said receiving conveyor, means for continuously driving said selector conveyor, means for vertically swinging the other end of said selector conveyor, a plurality of delivery conveyors having their receiving ends positioned in vertically spaced relation adjacent the path of the swinging end of said selector conveyor to receive articles therefrom, said delivery conveyors being arranged to deliver to said handling machines, means for continuously driving said delivery conveyors, control means connected to actuate said means for raising and lowering said selector conveyor at a predetermined time after each stoppage of said receiving conveyor, and switch means including position sensing switches associated with each of said delivery conveyors and positioned to be actuated by said selector conveyor, said last switch means being connected to said control means for predetermining the direction and sequence of movement of said selector conveyor between said delivery conveyors.

12. A conveyor system for advancing bread from an oven to a plurality of wrapping machines comprising, a first conveyor means positioned to advance from said oven, a plurality of delivery conveyors positioned to deliver one to each of said wrapping machines and having receiving ends positioned in vertically spaced relation, a selector conveyor having one end pivotally supported adjacent the delivery end of said first conveyor means to receive bread therefrom and having a second end swingable between the receiving ends of said delivery conveyors, means for moving the swinging end of said selector conveyor vertically, control means connected to regulate said means for moving said swingable conveyor in timed relationship with the delivery of bread to said first conveyor, other adjustable control means interconnected with said first control means for predetermining the sequence of movement of said selector conveyor between said delivery conveyors, and means for interrupting the delivery of bread from said first conveyor to said selector conveyor prior to and during each vertical movement of said selector conveyor.

13. A conveyor system for advancing bread from an oven to a plurality of wrapping machines comprising, a first conveyor means positioned to advance from said oven, a plurality of delivery conveyors positioned to deliver one to each of said wrapping machines and having receiving ends positioned in vertically spaced relation, a selector conveyor having one end pivotally supported adjacent the delivery end of said first conveyor means to receive bread therefrom and having a second end swingable between the receiving ends of said delivery conveyors, means for moving the swinging end of said selector conveyor vertically, control means connected to regulate said means for moving said swingable conveyor for operation at intervals, other control means interconnected with said first control means for predetermining the sequence of movement of said selector conveyor between said delivery conveyors, and means for interrupting the delivery of bread from said first conveyor means to said selector conveyor prior to and during each vertical movement of said selector conveyor.

14. A conveyor system for advancing articles from a source to a plurality of delivery stations comprising, a first conveyor means positioned to advance articles from said source, a plurality of delivery conveyors positioned to deliver one to each of said stations and having receiving ends positioned in adjacent closely spaced relation, a selector conveyor having one end pivotally supported adjacent the delivery end of said first conveyor means to receive articles therefrom and having a second end swingable between the receiving ends of said delivery conveyors, means for moving the swinging end of said selector conveyor into registry with the ends of said delivery conveyors, control means connected to actuate said means for moving said swingable conveyor in timed relationship with the delivery of articles to said first conveyor, other control means interconnected with said first control means for predetermining the sequence of movement of said selector conveyor between said delivery conveyors, and means for interrupting the delivery of articles from said first conveyor to said selector conveyor prior to each movement of said selector conveyor.

15. A conveyor system for advancing articles from a source to a plurality of delivery stations comprising, a first conveyor means positioned to advance articles from said source, a plurality of delivery conveyors positioned to deliver one to each of said stations and having receiving ends positioned in adjacent closely spaced relation, a selector conveyor having one end pivotally supported adjacent the delivery end of said first conveyor means to receive articles therefrom and having a second end swingable between the receiving ends of said delivery conveyors, means for moving the swinging end of said selector conveyor, control means connected to actuate said means for moving said swingable conveyor at intervals in timed relationship with movement of articles by said first conveyor, and other control means interconnected with said first control means for predetermining the sequence of movement of said selector conveyor between a selected fraction of said delivery conveyors.

16. In a conveying system for advancing articles from a single source to a plurality of delivery points, the combination of a first conveyor means for advancing the articles from the source, a plurality of delivery conveyors arranged to deliver to the separate points and each having its other end positioned in vertically spaced relationship, a selector conveyor having one end pivotally supported adjacent said first conveyor means to receive articles therefrom and having its other end swingable along the arc of the ends of said delivery conveyors whereby the selector conveyor can be operatively associated with each of said delivery conveyors, control mechanism for regulating the swinging motion of said selector conveyor including position sensing switches associated one with each of said delivery conveyors and positioned to be actuated by said selector conveyor when the selector conveyor is in registry with a delivery conveyor, and means operatively connected to said control mechanism for interrupting the delivery of articles from said first conveyor means to said selector conveyor prior to movement of said selector conveyor.

17. In a conveying system for advancing articles from a single source to a plurality of delivery points, the combination of a first conveyor means for advancing the articles from the source, a control element positioned to be actuated by delivery of articles from said source to said first conveyor means, a plurality of delivery conveyors arranged to deliver to the separate points and each having its other end positioned in vertically spaced relationship, a selector conveyor having one end pivotally supported adjacent said first conveyor means to receive articles therefrom and having its other end swingable along an arc adjacent the ends of said delivery conveyors whereby the selector conveyor can be operatively associated with each of said delivery conveyors, control mechanism for regulating the swinging motion of said selector conveyor including position sensing switches associated one with each of said delivery conveyors and positioned to be actuated by said selector conveyor when the selector conveyor is in registry with a delivery conveyor and connected to said control element to be actuated in timed relationship with each actuation of said control element and other control mechanism interconnected with said first control mechanism and said sensing switches for selectively determining the sequence of movement of said selector conveyor to said plurality of conveyors.

18. In a conveying system for advancing articles from a single source to a plurality of delivery points, the combination of a first conveyor means for advancing the articles from the source, a control element positioned to be actuated by delivery of articles from said source to said first conveyor means, a plurality of delivery conveyors arranged to deliver to the separate points and each having its other end positioned in vertically spaced relationship, a selector conveyor having one end pivotally supported adjacent said first conveyor means to receive articles therefrom and having its other end swingable along an arc adjacent the ends of said delivery conveyors whereby the selector conveyor can be operatively associated with each of said delivery conveyors, control mechanism for regulating the swinging motion of said selector conveyor and connected to said control element to be actuated in timed relationship with each actuation of said control element, and other control mechanism interconnected with said first control mechanism determining the sequence of movement of said selector conveyor to said plurality of conveyors.

References Cited in the file of this patent
UNITED STATES PATENTS

| | | |
|---|---|---|
| 959,996 | Cole | May 31, 1910 |
| 1,361,294 | Tschache | Dec. 7, 1920 |
| 1,671,534 | Lockhart | May 29, 1928 |
| 1,913,533 | Brunner | June 13, 1933 |
| 1,959,662 | Ellis | May 22, 1934 |